United States Patent
Takahashi et al.

(10) Patent No.: US 6,901,195 B2
(45) Date of Patent: May 31, 2005

(54) OPTICAL FIBER AND AN OPTICAL TRANSMISSION SYSTEM USING THE OPTICAL FIBER

(75) Inventors: Fumio Takahashi, Tokyo (JP); Mitsuhiro Kawasaki, Tokyo (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 181 days.

(21) Appl. No.: 10/447,269

(22) Filed: May 29, 2003

(65) Prior Publication Data

US 2004/0033040 A1 Feb. 19, 2004

(30) Foreign Application Priority Data

May 30, 2002 (JP) ........................................ 2002-157035
Jun. 5, 2002 (JP) ........................................ 2002-163960

(51) Int. Cl.$^7$ .............................. G02B 6/02; H04J 14/02
(52) U.S. Cl. .......................... 385/123; 385/124; 398/81
(58) Field of Search ................................. 385/123–128; 398/81

(56) References Cited

U.S. PATENT DOCUMENTS

| | | | | |
|---|---|---|---|---|
| 4,715,679 A | * | 12/1987 | Bhagavatula | ................ 385/127 |
| 6,487,353 B2 | * | 11/2002 | Kato et al. | .................. 385/127 |
| 6,681,082 B1 | * | 1/2004 | Tanaka et al. | ............. 398/158 |
| 6,714,705 B1 | * | 3/2004 | Lin et al. | ...................... 385/37 |

* cited by examiner

*Primary Examiner*—Akm Enayet Ullah
*Assistant Examiner*—Tina M Lin
(74) *Attorney, Agent, or Firm*—Eric J. Robinson; Robinson Intellectual Property Law Office, P.C.

(57) ABSTRACT

An optical fiber suitable for the WDM transmission in the wavelength bands of 1.31 μm and 1.55 μm is provided. An optical fiber is characterized by a zero dispersion wavelength of longer than 1330 nm and shorter than 1430 nm, a dispersion of not less than 6 ps/nm/km and not more than 15 ps/nm/km at a wavelength of 1550 nm, a ratio of a dispersion to a dispersion slope of not less than 200 nm and not mare than 400 nm at a wavelength of 1550 nm, a dispersion of not more than −1 ps/nm/km and not less than−8 ps/mn/km at 1300 nm, and a cutoff wavelength of 1300 nm or shorter.

12 Claims, 3 Drawing Sheets

OPTICAL FIBER AND AN OPTICAL TRANSMISSION SYSTEM USING THE OPTICAL FIBER

FIELD OF THE INVENTION

This invention relates to an optical fiber suitable as an optical transmission line in optical communications, and the optical transmission system using the optical fiber.

BACKGROUND OF THE INVENTION

Conventionally, the technology of using the signal light of wavelength in the 1.31 μm and 1.55 μm band in optical communications is established.

The optical fiber which has been mainly used as an optical transmission line in optical communications is a standard Single Mode Fiber (SMF) having zero dispersion wavelength in the 1.31 μm band. (1.3 μm band corresponds to the wavelength band of 1300–1324 nm, hereinafter).

Moreover, the transmission loss of silica, which is the base material of an optical fiber, is minimum in the 1.55 μm band. Combining with the development of the Erbium Doped Fiber Amplifier (EDFA) to carry out high efficient optical amplification in the 1.55 μm band, the Dispersion Shifted Fiber (DSF) which has zero dispersion wavelength in the 1.55 μm band has been recently commercialized as an optical transmission line for wavelength division multiplexing (WDM) transmission. (1.55 μm band corresponds to the wavelength band of 1530–1570 nm, hereinafter.).

However, when the SMF having zero dispersion wavelength in the 1.31 μm band is used as an optical transmission line, too low dispersion in the 1.31 μm band tends to result in Four Wave Mixing (FWM) in the 1.31 μm band, which is one of the nonlinear phenomena, and on the other hand too large dispersion in the 1.55 μm band makes it difficult for WDM transmission in a wide band.

Meanwhile, when the DSF having zero dispersion wavelength in the 1.55 μm band is used as an optical transmission line, too low dispersion in the 1.55 μm band tends to result in FWM in the 1.55 μm band, which is one of the nonlinear phenomena, and on the other hand too large dispersion in the 1.31 μm band makes it difficult for WDM transmission in a wide band.

The U.S. Pat. No. 5,905,838 discloses the optical fiber, which enables WDM transmission in both the wavelength bands of 1.31 μm and 1.55 μm.

In the optical fiber disclosed by the U.S. Pat. No. 5,905,838, the absolute value of dispersion is made low in both the wavelength bands by shifting the zero dispersion wavelength into the range between 1350 nm and 1450 nm, and reducing the dispersion slope in both the 1.31 μm and 1.55 μm band.

The fiber enables a data-transmission capacity of 100 or more channels with a transmission speed of 2.5 Gbps without employing dispersion compensation in a relatively short distance system, applicable for metropolitan area.

SUMMARY OF THE INVENTION

Although the metropolitan system is a short distance system, it may be widely used by many members and the transmission capacity may rapidly increase. The metropolitan system must not only be low cost but also preferably compatible for the high speed and large capacity transmission technology already commercialized in the 1.55 μm band, needless to mention about making the WDM transmission in the 1.31 μm band possible. However such an optical fiber is not yet been disclosed.

This invention is made considering the above-mentioned situation, and is aimed to provide an optical fiber suitable for WDM transmission in the 1.31 μm and 1.55 μm bands in order to realize the optical transmission system of high speed and large capacity.

An optical fiber of the present invention is characterized by a zero dispersion wavelength of longer than 1330 nm and shorter than 1430 nm, a dispersion of not less than 6 ps/nm/km and not more than 15 ps/nm/km at a wavelength of 1550 nm, a DPS (DPS is an abbreviation of Dispersion Per Slope, which means a ratio of the dispersion to the dispersion slope) of not less than 200 nm and not more than 400 nm at a wavelength of 1550 nm, a dispersion of not more than −1 ps/nm/km and not less than −8 ps/nm/km at 1310 nm, and a cutoff wavelength of 1300 nm or shorter.

The effective area of the optical fiber is preferably not less than 40 $\mu m^2$ and not more than 70 $\mu m^2$ at a wavelength of 1550 nm.

The transmission loss of the optical fiber is preferably 0.4 dB/km or less at a wavelength of 1385 nm, before and after hydrogen ageing.

The bending loss of the optical fiber is preferably 0.05 dB/turn or less in a bending diameter of 32 mm at a wavelength of 1550 nm.

The dispersion of the optical fiber is preferably not less than 8 ps/nm/km and not more than 15 ps/nm/km at a wavelength of 1550 nm.

The positive dispersion slope of the optical fiber is less than 0.1 $ps/nm^2/km$ at wavelengths of 1310 nm and 1550 nm.

DESCRIPTION OF THE PREFERRED EMBODIMENTS

Preferred embodiments of the present invention are explained here after with reference to the figures.

Figure 1:
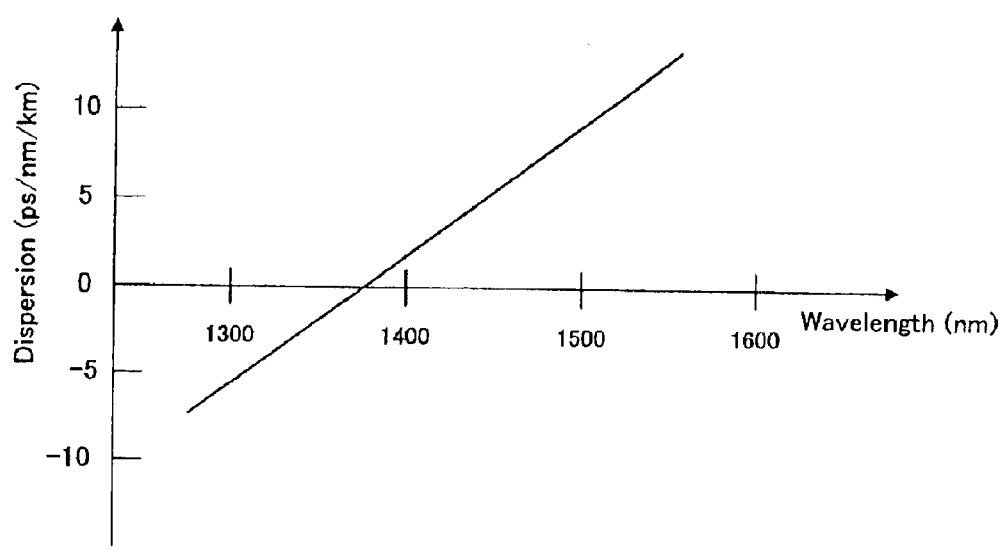
FIG. 1 shows dispersion characteristics of an embodiment of the present invention.

FIG. 1 shows dispersion characteristics of an embodiment of the present invention.

The zero dispersion wavelength of the optical fiber of this embodiment is longer than 1330 nm and shorter than 1430 nm.

Transmission loss may increase due to the hydroxyl ion absorption at the wavelength of 1385 nm, and WDM transmission is not suitable around this wavelength.

Therefore, the optical fiber of the embodiment has a zero dispersion wavelength in the range of 1330 nm to 1430 nm, containing the 1385 nm, not including a zero dispersion wavelength around the 1.31 μm and 1.55 μm band.

Moreover, the dispersion of the present embodiment is not less than 6 ps/nm/km, preferably not less than 8 ps/nm/km, and not more than 15 ps/nm/km, at a wavelength of 1550 nm. And the dispersion is not more than −1 ps/nm/km and not less than −8 ps/nm/km at 1310 nm.

By making the zero dispersion wavelength and dispersion to the above-mentioned values, the zero dispersion wavelength is not included around the 1.31 μm and 1.55 μm band and the absolute value of the dispersion is not too small, thereby generation of nonlinear phenomena, such as FWM, can be suppressed.

Furthermore, in both the 1.31 μm and 1.55 μm bands, since the absolute value of dispersion is not too large, WDM transmission over a wide band can be performed.

The value of DPS of this embodiment is 200–400 nm, at 1550 nm.

Since waveform distortion due to the accumulative dispersion becomes a problem at 40 Gbps or more, dispersion compensation will be needed. A common dispersion compensating fiber (C-DCF) at present designed to compensate a dispersion of the standard SMF recommended in the ITU-T G.652. Since the dispersion and dispersion slope of the standard SMF is about 17 ps/nm/km and 0.056 ps/nm²/km at 1550 nm, respectively, therefore the DPS becomes about 300 nm at 1550 nm. In order to utilize the C-DCF, it is desired that the DPS of an optical fiber should be approximately equal to that of the standard SMF at 1550 nm.

The DPS value of this embodiment at 1550 nm is 200–400 nm and the dispersion of this embodiment can be compensated by using the above-mentioned C-DCF over a wide band, and thereby the high-speed transmission of 40 or more Gbps can be achieved.

Moreover, the cutoff wavelength of the optical fiber of this embodiment is 1300 nm or shorter. In this case, single mode propagation is ensured in the 1.31 μm and 1.55 μm bands. In addition, here, the cutoff wavelength is the cable cutoff wavelength λ cc, as defined by ITU-T G. 650.

It is desirable that the dispersion slopes of the optical fibers of this embodiment at 1310 nm and 1550 nm are positive, and their absolute values are less than 0.10 ps/nm²/km. If the dispersion slope of an optical fiber is steeper, the difference of the dispersion per wavelength will become larger, and will adversely affect the WDM transmission. By making the dispersion slope at both the 1310 nm and 1550 nm to less than 0.10 ps/nm²/km, the difference of the dispersion per wavelength is suppressed, and the adverse effect to WDM transmission can be prevented.

Moreover, it is desirable that the transmission loss in the wavelength of 1385 nm is 0.4 dB/km or less.

OH contaminants, which cause an absorption peak around 1385 nm, are existing in the conventional optical fibers as impurities in many cases. It is known that the optical fiber containing these impurities has large transmission loss around 1385 nm in the initial state itself; Furthermore, when the structure defect remains mostly in an optical fiber, then, if hydrogen is generated in the cable, the transmission loss at around 1385 nm and around 1520 nm may increase remarkably. And, especially when the absorption peaks are large, the transmission loss in 1.31 μm or 1.55 μm band may also increase.

Therefore, by making the transmission loss to 0.4 dB/km or less at 1385 nm before and after the hydrogen ageing, more stable WDM transmission can be performed.

Here, the hydrogen ageing is referred to IEC60793-2 Amendment 1 and 2001-8 Annex C:

Hydrogen exposure of 0.01 atmosphere of hydrogen at room temperature is carried out until the transmission loss changes by 0.03 dB/km or more at 1240 nm and the increase in the transmission loss after leaving it for more than 14 days in open atmosphere is measured. In this case, measurement wavelength is set to 1385 nm.

Moreover, it is desirable that the effective area is not less than 40 μm² and not more than 70 μm² at 1550 nm.

Although it is desirable to have a larger effective area for the suppression of generation of nonlinear phenomena, such as FWM, if the effective area is too large, the dispersion slope generally becomes large, and it is not desirable for the purpose of this invention.

Moreover, it is desirable that the bending loss is less than 0.05 dB/turn in a bending diameter of 32 mm at 1550 nm. Since the bending loss is small, the loss increase during and/or after cabling will be small.

Figure 2:
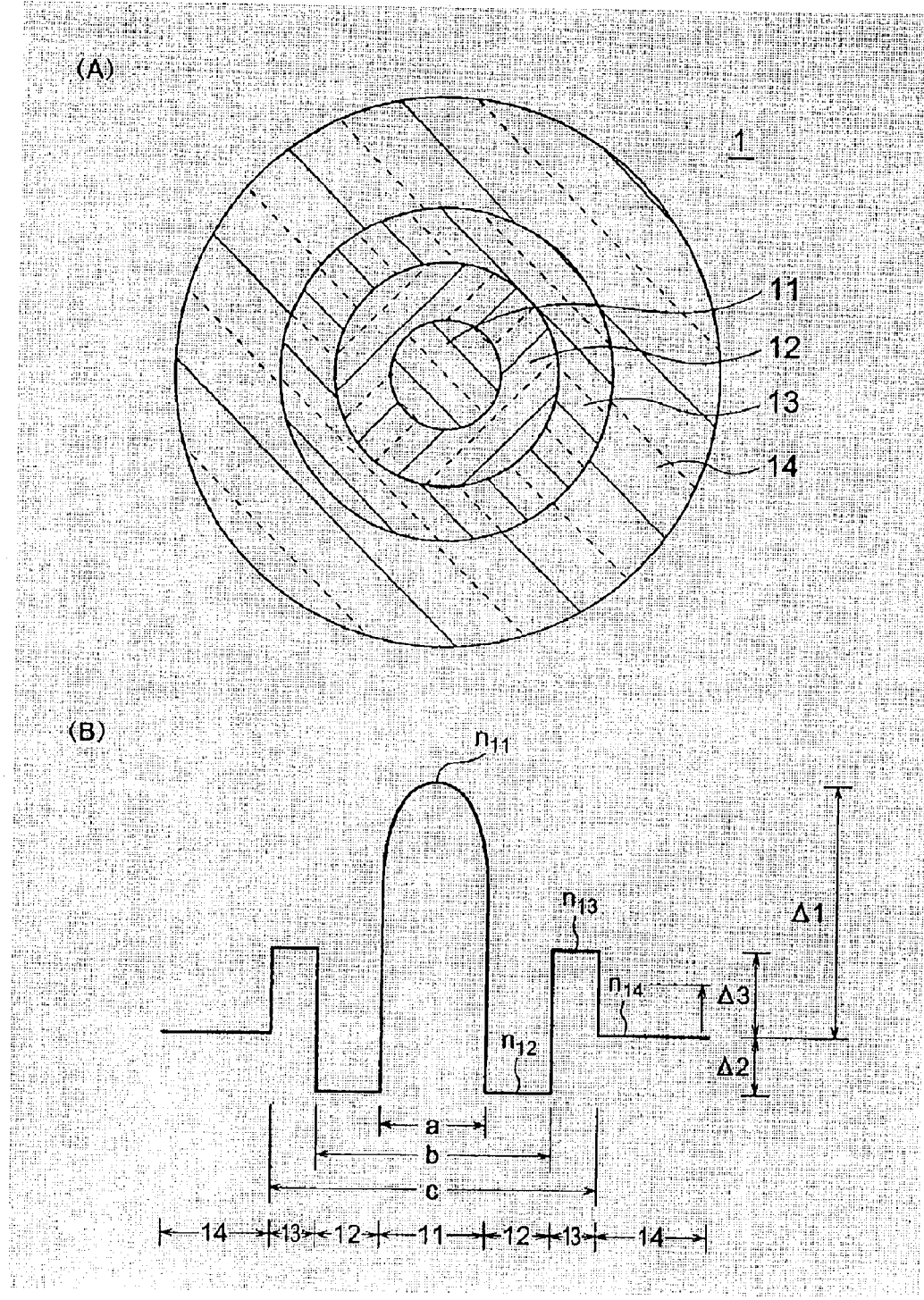
FIG. 2(A) and FIG. 2(B) show a cross-sectional view and the refractive index profile of an embodiment of the present invention, respectively.

Next, the construction of this embodiment having the above-mentioned characteristics is explained. FIG. 2(A) is a cross-sectional view of the optical fiber 1 concerning this embodiment, and FIG. 2(B) is a refractive index profile of such an optical fiber.

The optical fiber of this embodiment comprises a central first core 11 having the highest refractive index, a second core surrounding the first core, the refractive index of which is lower than that of the first core, a third core surrounding the second core, the refractive index of which is lower than that of the first core but higher than that of second core, and a cladding 14 surrounding the third core.

The refractive index n11 of the first core 11, the refractive index n12 of the second core 12, the refractive index n13 of the third core 13, and the refractive index n14 of cladding 14 are made to the condition of n11>n13>n14>n12. Moreover, the refractive index difference Δ1 of the first core 11 with the cladding 14 is around 0.6%, the refractive index difference Δ2 of the second core 12 with the cladding is around −0.1% and the refractive index difference Δ3 of the third core with the cladding is around 0.23%. The above-mentioned refractive index differences Δ1, Δ2 and Δ3 are expressed with following equations (1)-(3), respectively $$\Delta 1 = (n11 - n14)/n14 \times 100 \tag{1}$$

$$\Delta 2 = (n12 - n14)/n14 \times 100 \tag{2}$$

$$\Delta 3 = (n13 - n14)/n14 \times 100 \tag{3}$$

Moreover, the ratios of the diameter "a" of the first core 11, the diameter "b" of the second core 12 and the diameter "c" of the third core 13, as shown in FIG. 2(B), are around 1:3.5:4.5.

The first core 11 and the third core 13 are formed by doping the element such as germanium (Ge), which raises the refractive index, to the pure silica (SiO2). Moreover, the second core 12 is formed by doping the element such as fluoride (F), which reduces the refractive index, to the pure silica.

Moreover, as it is necessary to minimize OH contaminants in order to reduce the transmission loss at 1385 nm, forming the first core 11 to the third core 13 is made in one process in the production of the optical fiber concerning this embodiment.

Since the optical fiber obtained by using this method does not have manufacturing boundaries in the core, OH contaminants can be suppressed to the minimum, and the transmission loss at 1385 nm can be reduced. Therefore, an optical fiber with very few structural defects in the core can be obtained.

Furthermore, by exposing the obtained optical fiber to an atmosphere containing deuterium ($D_2$), the few remaining structural defects are filled with the deuterium and an optical fiber whose transmission loss at 1385 nm hardly changes before and after hydrogen ageing can be obtained.

The optical fiber of this embodiment having the above-mentioned characteristics can be realized by adjusting the refractive indices n11, n12 and n13 and the diameters "a","b" and "c" of the first, the second and the third core respectively and the refractive index profile of the first core.

Figure 3:
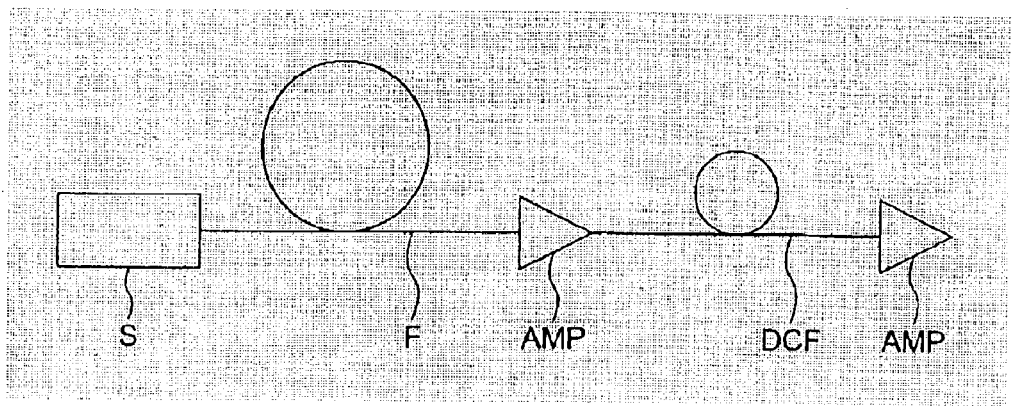
FIG. 3 is a diagram of a WDM transmission system of the embodiment of the present invention.

FIG. 3 is a diagram of the WDM transmission system in which the dispersion of this embodiment is compensated with the C-DCF designed for the standard SMF. The signal from the signal light source S is transmitted by the optical fiber F concerning this embodiment, amplified by the amplifier AMP and then transmitted by the dispersion compensating fiber DCF.

The DPS value of the optical fiber of this embodiment at 1550 nm is 200–400 nm and hence by using the above-mentioned C-DCF for the standard SMF, the dispersion can be compensated over a wide band, and the high-speed transmission of 40 or more Gbps becomes possible.

EXAMPLE

Next, the concrete examples of the present invention are explained.

First, the first core 11, the second core 12, and the third core 13 have been produced in one process using the VAD (Vapor Phase Axial Deposition) method with three burners, and vitrified under fluorine containing atmosphere. Dehydrating and sintering conditions are shown in Table 1.

TABLE 1

|  | Dehydrating Step | sintering Step |
| --- | --- | --- |
| Fireplace Temperature | 1100° C. | 1350° C. |
| He Gas | 10 l/min | 10 l/min |
| Fluorine compound Gas | — | 0.5 l/min |
| Chlorine Gas | 0.5 l/min | 0.5 l/min |

Next, the cladding was formed over the above glass rod, by using the OVD (Outside Vapor Deposition) method and vitrified, then the preform of the optical fiber of this embodiment is obtained.

Thus, after drawing the obtained perform, the optical fiber concerning this example is obtained. After exposing it to a 1 atmosphere deuterium environment at room temperature for 2 hours, the optical fiber of example 1 and 2 having the characteristics shown in Table 2 were obtained.

In Table 2, the characteristics of the optical fibers of example 1 and 2 of this invention such as the zero dispersion wavelengths, the dispersions and dispersion slopes at 1310 nm and 1550 nm, the DPS at 1550 nm, the cutoff wavelengths, the effective area at 1550 nm, the bending loss per turn in a bending diameter of 32 mm at 1550 nm and the transmission loss at 1385 nm before and after the hydrogen ageing experiment are presented collectively.

Figure 4:
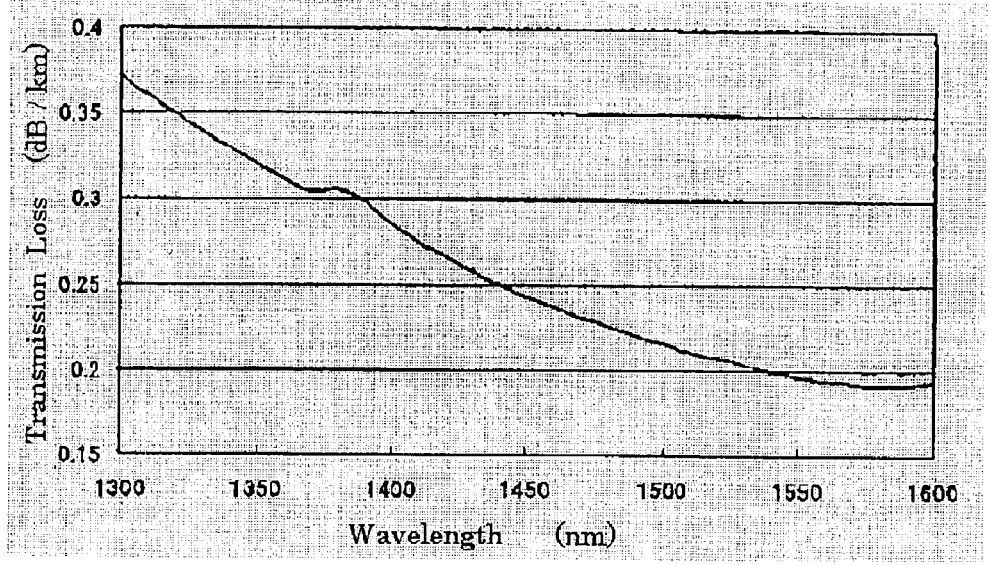
FIG. 4 is transmission loss spectra of an embodiment of the present invention after hydrogen ageing.

Moreover, the transmission loss spectra of the optical fiber of example 1 after hydrogen ageing experiment is shown in FIG. 4.

TABLE 2

|  | Zero-Dispersion Wavelength (nm) | Dispersion (ps/nm/km) | | Dispersion Slope (ps/nm²/km) | | DPS (nm) | Cutoff Wavelength (nm) | Aeff ($\mu m^2$) | Bending Loss (dB) |
| --- | --- | --- | --- | --- | --- | --- | --- | --- | --- |
|  |  | 1310 nm | 1550 nm | 1310 nm | 1550 nm | 1550 nm |  | 1550 nm | 1550 nm |
| 1 | 1385 | −6.0 | +9.8 | 0.076 | 0.047 | 208 | 1249 | 54.8 | 0.03 |
| 2 | 1345 | −2.0 | +12.3 | 0.062 | 0.046 | 267 | 1226 | 52.1 | 0.02 |

As shown in Table 2, the optical fiber whose zero dispersion wavelengths is in the range of 1330 nm to 1430 nm, cutoff wavelength is 1300 nm or shorter, dispersion is 6 to 15 ps/km/nm at 1550 nm, DPS value is 200 to 400 nm at 1550 nm and whose dispersion is −1 to −8 ps/km/nm at 1300 nm was realized.

By using this optical fiber, WDM transmission of about 2.5 Gbps of transmission speed in the 1.31 $\mu m$ band was made possible. On the other hand, by using the C-DCF designed for the standard SMF, dispersion could be compensated over a wide band is attained in the 1.55 $\mu m$ band and the high-speed transmission of 40 or more Gbps became possible.

Thus, the optical fiber concerning the above-mentioned example of the present invention is suitable to realize WDM transmission in the 1.31 $\mu m$ and 1.55 $\mu m$ bands.

The present invention is not limited to the above-mentioned examples of the embodiment.

For example, the optical fiber may have the compositions and refractive index profiles other than that shown in the embodiment, fulfilling the necessary characteristics, and any manufacturing process of the optical fiber other than that included in the present embodiment that decreases the OH contaminants is acceptable. Additionally, various other forms, which do not deviate from the summary of the present invention, are possible.

By the present invention, the optical fiber suitable for high speed and large capacity WDM transmission in the 1.31 μm and 1.55 μm bands is provided.

What is claimed is:

1. An optical fiber characterized by
   a zero dispersion wavelength of longer than 1330 nm and shorter than 1430 nm,
   a dispersion of not less than 6 ps/nm/km and not more than 15 ps/nm/km at a wavelength of 1550 nm,
   a ratio of a dispersion to a dispersion slope of not less than 200 nm and not more than 400 nm at a wavelength of 1550 nm,
   a dispersion of not more than −1 ps/nm/km and not less than −8 ps/nm/km at a wavelength of 1310 nm, and
   a cutoff wavelength of 1300 nm or shorter.

2. The optical fiber of claim 1, further characterized by an effective area of not less than 40 μm2 and not more than 70 μm$^2$ at a wavelength of 1550 nm.

3. The optical fiber of claim 2, further characterized by a transmission loss of 0.4 dB/km or less at a wavelength of 1385 nm before and after hydrogen ageing.

4. The Optical fiber of claim 3, further characterized by a bending loss of 0.05 dB/turn or less in a bending diameter of 32 mm at a wavelength of 1550 nm.

5. The Optical fiber of claim 4, further characterized by a dispersion of not less than 8 ps/nm/km and not more than 15 ps/nm/km at a wavelength of 1550 nm.

6. An optical transmission system comprising the optical fiber of claim 1 as the transmission line.

7. The optical fiber of claim 1, further characterized by a positive dispersion slope of less than 0.1 ps/nm2/km at wavelengths of 1310 nm and 1550 nm.

8. The optical fiber of claim 7, further characterized by an effective area of not less than 40 μm2 and not more than 70 μm2 at a wavelength of 1550 nm.

9. The optical fiber of claim 8, further characterized by a transmission loss of 0.4 dB/km or less at a wavelength of 1385 nm before and after hydrogen ageing.

10. The optical fiber of claim 9; further characterized by a bending loss of less than 0.05 dB/turn in a bending diameter of 32 mm at a wavelength of 1550 nm.

11. The optical fiber of claim 10, further characterized by a dispersion of not less than 8 ps/nm/km and not more than 15 ps/nm/km at a wavelength of 1550 nm.

12. An optical transmission system comprising the optical fiber of claim 7 as the transmission line.

* * * * *